Dec. 29, 1953 E. M. ROSCHKE 2,664,460

SUBSCRIPTION TYPE TELEVISION SYSTEM

Filed April 26, 1950 5 Sheets-Sheet 1

ERWIN M. ROSCHKE
*INVENTOR.*

BY Francis W. Crotty

HIS ATTORNEY

Dec. 29, 1953 E. M. ROSCHKE 2,664,460

SUBSCRIPTION TYPE TELEVISION SYSTEM

Filed April 26, 1950 5 Sheets-Sheet 2

ERWIN M. ROSCHKE
*INVENTOR.*

BY Francis W. Crotty

HIS ATTORNEY

Dec. 29, 1953 E. M. ROSCHKE 2,664,460

SUBSCRIPTION TYPE TELEVISION SYSTEM

Filed April 26, 1950 5 Sheets-Sheet 3

ERWIN M. ROSCHKE
*INVENTOR.*

BY Francis W. Crotty
HIS ATTORNEY

Dec. 29, 1953 E. M. ROSCHKE 2,664,460

SUBSCRIPTION TYPE TELEVISION SYSTEM

Filed April 26, 1950 5 Sheets-Sheet 4

ERWIN M. ROSCHKE
*INVENTOR.*

BY Francis W. Crotty

HIS ATTORNEY

Dec. 29, 1953 E. M. ROSCHKE 2,664,460

SUBSCRIPTION TYPE TELEVISION SYSTEM

Filed April 26, 1950

5 Sheets-Sheet 5

ERWIN M. ROSCHKE
*INVENTOR.*

BY Francis W. Crotty

HIS ATTORNEY

Patented Dec. 29, 1953

2,664,460

UNITED STATES PATENT OFFICE 2,664,460

SUBSCRIPTION TYPE TELEVISION SYSTEM

Erwin M. Roschke, Broadview, Ill., assignor to Zenith Radio Corporation, a corporation of Illinois Application April 26, 1950, Serial No. 158,297

20 Claims. (Cl. 178—5.1)

Figure 1:
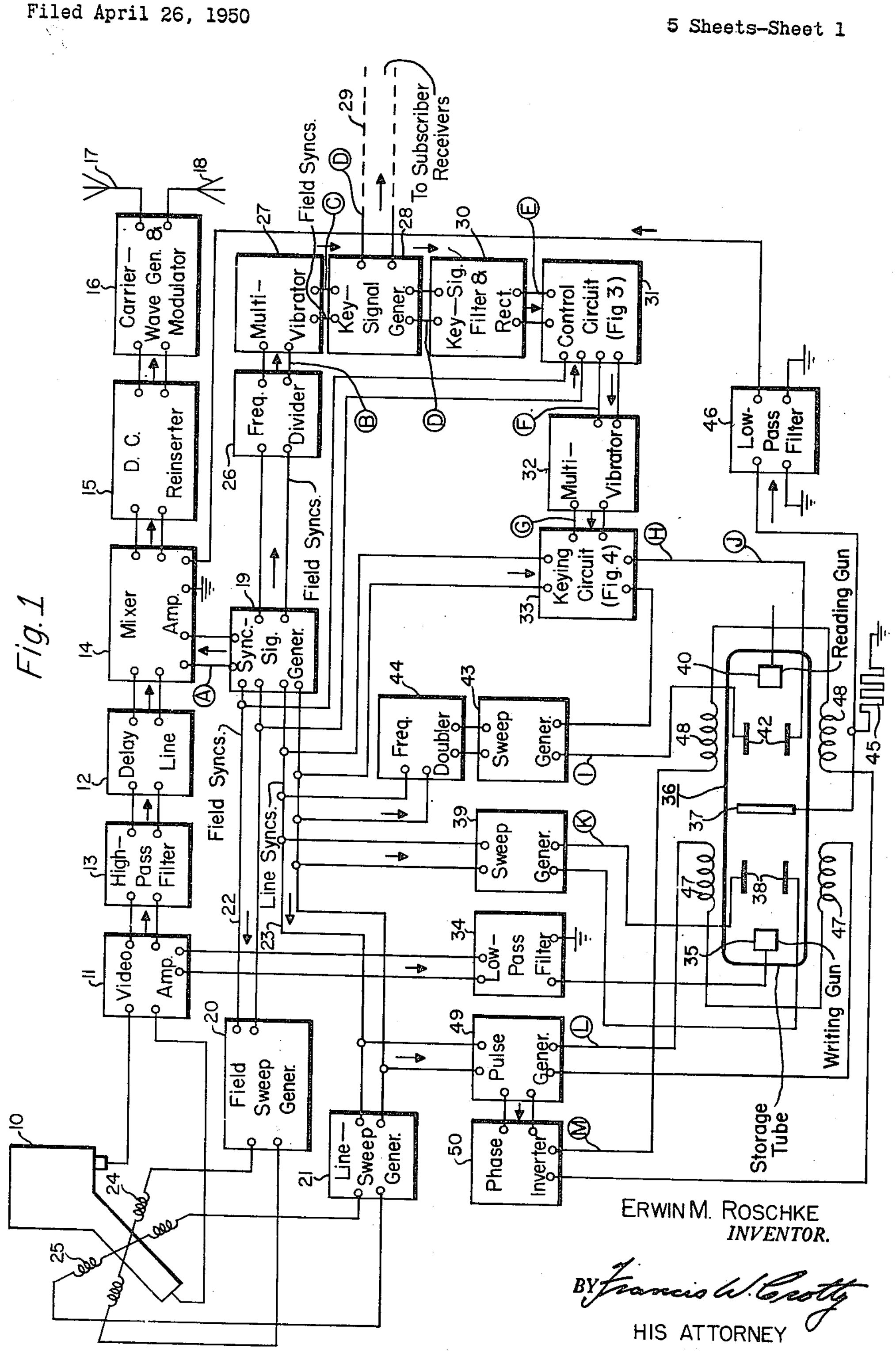

This invention relates to television systems of the subscription type, and more particularly to such systems in which a television signal is radiated in coded or scrambled form and a key signal indicating the coding schedule of the radiated signal is transmitted to subscriber receivers over a line circuit such as a telephone circuit, power circuit, or the like.

Patent 2,510,046, Ellett et al., issued May 30, 1950, and entitled "Radio-Wire Signalling System" and Patent 2,547,598, Roschke, issued April 3, 1951, and entitled "Image Transmission System," both assigned to the present assignee, disclose subscriber signalling systems similar in some respects to that of the present invention. Both patents disclose systems in which a radiated signal is insufficient in itself to permit intelligent reproduction of the transmitted information. In these systems a key signal is transmitted to subscriber receivers over a line circuit and enables such receivers, upon concurrent reception of the radiated signal and the wire-conducted key signal, to reproduce the transmitted information. It is contemplated that some means will be provided in the line circuit to determine the time of use of the key signal by each subscriber so that suitable charges for the subscription service may be assessed. While the present invention is directed to a generally similar type of system, at the transmitter each line of video information generated by the pick-up tube or other video signal source is stored for a preselected interval, scrambled or coded in accordance with a coding schedule which may be entirely random, and mixed with synchronizing components to form a coded television signal for radiation to subscriber receivers. Complementary apparatus is provided at each receiver for storing the received video information for the same preselected interval, for unscrambling or decoding that information, and for applying it to an image-reproducing tube. The coding schedule employed at the transmitter is made known to the various subscriber receivers by means of a key signal transmitted thereto over a line circuit so that the receiver apparatus may be actuated at the proper times to perform its unscrambling function.

In the present system, the synchronizing circuits of the receiver are undisturbed wherefore there is little likelihood of adverse interference between them and the video translating circuits. Moreover, since there is no alteration in the relative timing of the video and synchronizing components of the radiated television signal, it is not necessary to compensate for changes in the direct-current component of the television signal that may arise due to such alterations in timing.

It is, accordingly, an object of this invention to provide a new and improved subscription television system in which a television signal is transmitted in coded form to be utilized only in subscriber receivers having appropriate decoding apparatus actuated in accordance with the coding schedule employed at the transmitter.

It is another object of the invention to provide a novel method of subscription broadcasting.

It is, still another object of this invention to provide an improved television system of the subscription type in which a television signal is transmitted over one channel to subscriber receivers in scrambled or coded form; and a key signal, indicating the coding schedule of the radiated signal, is transmitted to such receivers over another channel.

A further object of this invention is to provide an improved transmitter for producing a coded television signal for transmission to subscriber receivers over one channel and for further producing a key signal, indicating the coding schedule of the coded signal, for transmission to such receivers over another channel.

Yet another object of this invention is to provide an improved subscriber receiver for utilizing a television signal coded in a particular manner and for concurrently utilizing a key signal representing the coding schedule of the received television signal.

Figure 2:
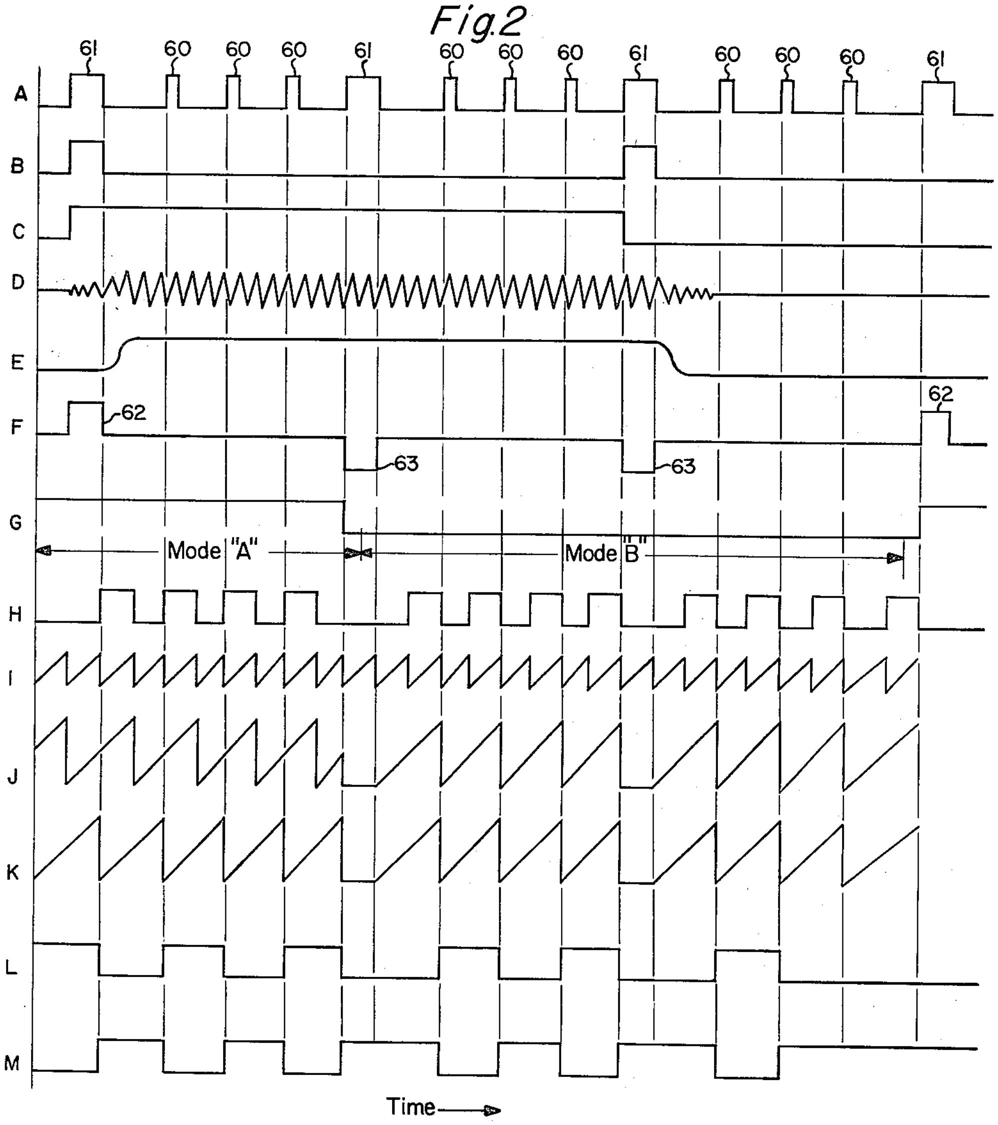
Figures 3, 4:
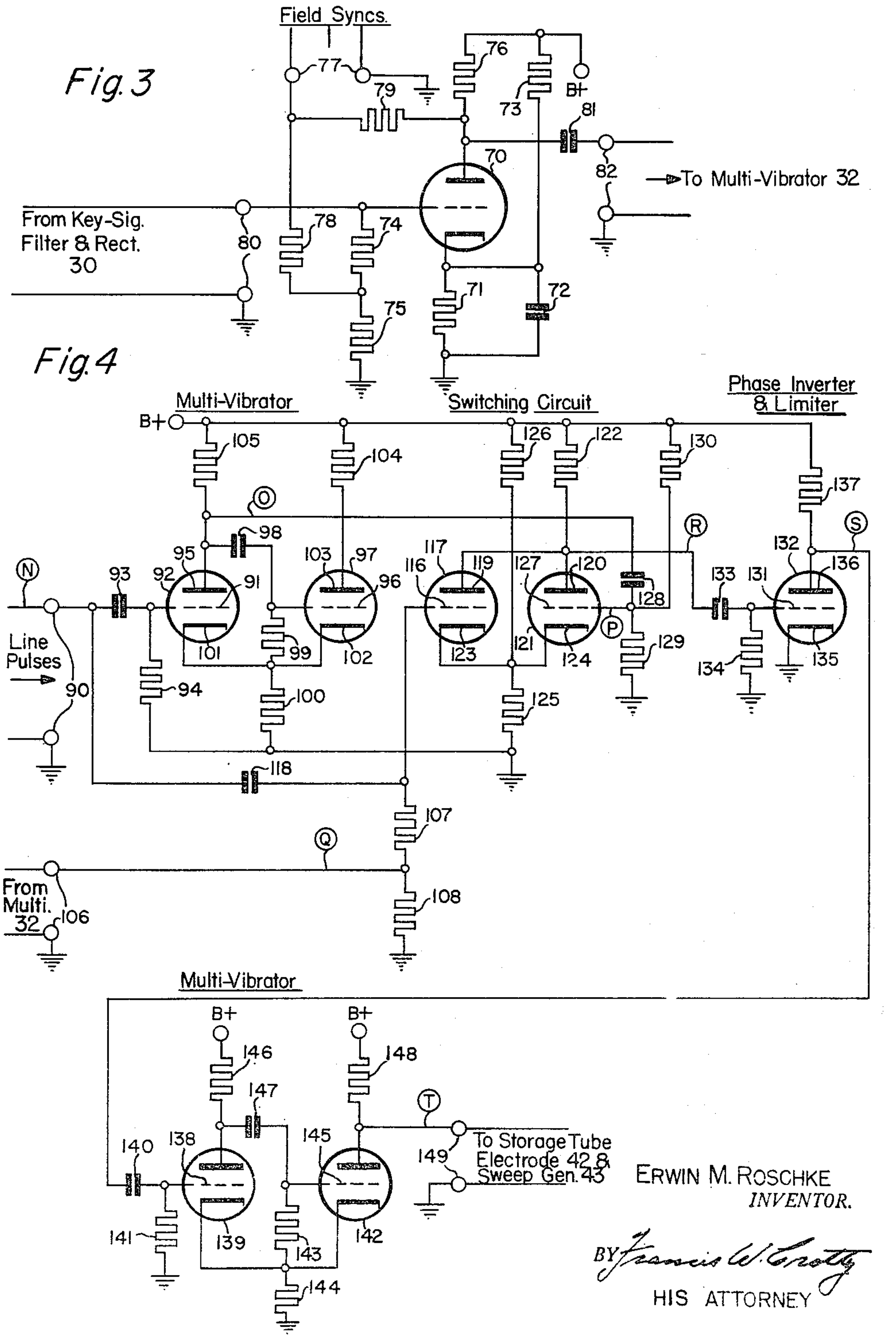
Figure 4A:
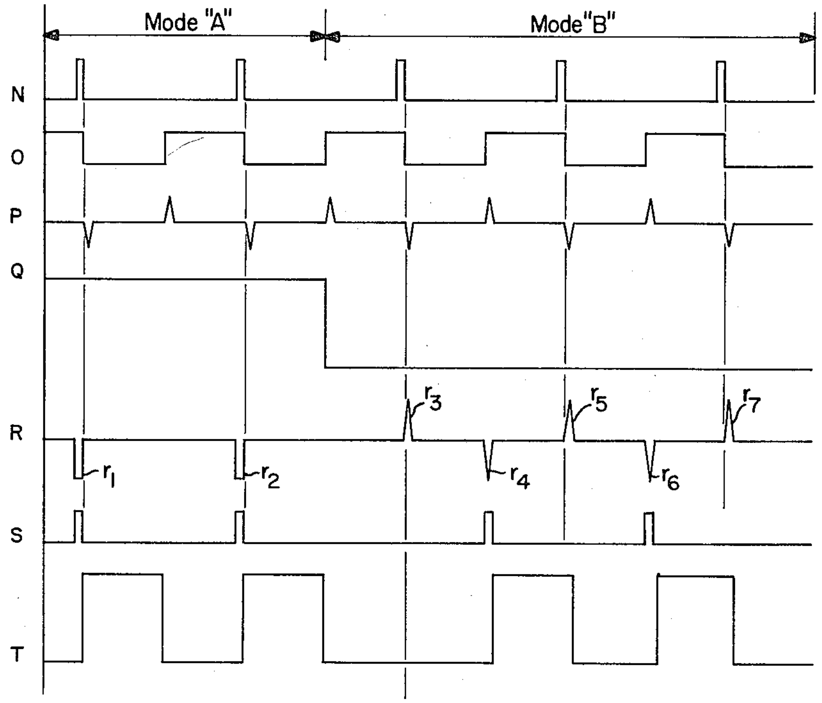
Figure 5:
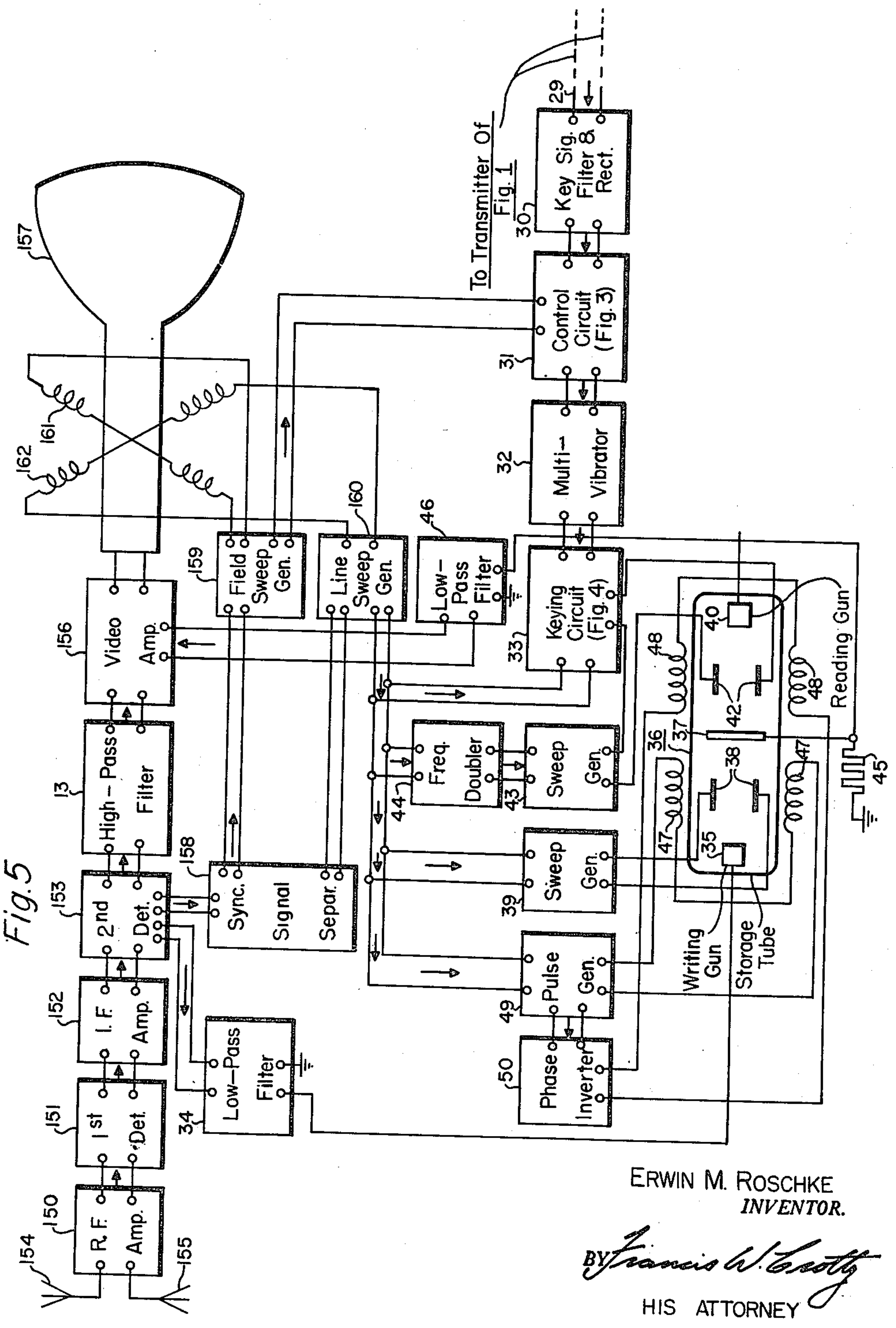

The features of this invention which are believed to be new are set forth with particularity in the appended claims. The invention itself, together with further objects and advantages thereof may best be understood by reference to the following description taken in conjunction with the accompanying drawings, in which:

Figure 1 shows a transmitter constructed in accordance with the invention,

Figure 2 comprises various curves useful in understanding the operation of that transmitter, Figures 3 and 4 are detailed circuit diagrams of certain components of the transmitter and receiver portions of the present invention, Figure 4A comprises various curves useful in understanding the operation of the circuit of Figure 4, and Figure 5 represents a receiver for operation in conjunction with the transmitter of Figure 1.

Referring now to Fig. 1, the subscription television transmitter illustrated therein includes a picture tube 10 of the image-dissector, image-orthicon, iconoscope or any other suitable type, The tube 10 is coupled to a video amplifier 11 of any desired number of stages, and this amplifier is coupled to a delay line 12 through a high-pass filter 13. The delay line 12 and filter 13 are included in the transmitter for reasons to be described and may be of any well-known construction. The delay line 12 is connected to a mixer amplifier 14 which, in turn, is connected to a direct-current reinserter 15. The reinserter has its output terminals connected to a carrier-wave generator and modulator 16, and the output terminals of unit 16 are connected to an appropriate antenna circuit 17, 18.

The transmitter includes a synchronizing-signal generator 19 for supplying field- and line-synchronizing signals as well as blanking pedestals required in the operation of the transmitter. The unit 19 is connected to mixer amplifier 14, and to a field-sweep generator 20 and a line-sweep generator 21 by way of leads 22 and 23 respectively. The output terminals of genenators 20 and 21 are connected to field-deflection coils 24 and line-deflection coils 25 of picture tube 10. The unit 19 is also connected to a frequency divider 26 which may be of the random type disclosed in copending application Serial No. 32,457, filed June 11, 1948, issued March 11, 1952, as Patent 2,588,413 to Roschke, entitled "Random Frequency Divider" and assigned to the present assignee. The output terminals of frequency divider 26 are connected to a multivibrator 27 of the well known "Eccles-Jordan" type which is triggered between two operating conditions by successive pulses produced by frequency divider 26. The multivibrator 27 is connected to a key-signal generator 28 constructed to generate bursts of a sine wave signal in response to pulses generated my multivibrator 27. A line circuit 29 is connected to one set of output terminals of generator 28 and this line circuit extends to each subscriber receiver included in the subscription television system.

Other output terminals of key-signal generator 28 are connected to a filter and rectifier 30 tuned to be highly selective at the frequency of the key signal, and connected to a control circuit 31 to be described in greater detail hereinafter. The control circuit 31 is connected to leads 22 extending from unit 19 to field-sweep generator 20, and is also connected to a multivibrator 32. The multivibrator 32 is of the "single shot" type, that is, a trigger circuit in which applied pulses of one polarity condition the circuit in one sense whereas applied pulses of the opposite polarity condition the circuit in the opposite sense. The multivibrator is connected to a keying circuit 33 to be described in greater detail hereinafter, and the keying circuit is connected to leads 23 extending between unit 19 and line-sweep generator 21.

The video amplifier 11 is also connected to a low-pass filter 34 the output terminals of which are connected to a writing gun 35 of a storage tube 36 to modulate a writing electron beam in this tube in accordance with the video components translated by the filter. The storage tube 36 may be of any well-known type, and a discussion of such tubes may be found in an article by L. Pensack appearing in the July 1949 edition of Electronics. The writing beam of storage tube 36 is deflected in a line-scanning direction over one surface of a screen 37 by means of deflection electrodes 38. A sweep generator 39 is connected to these deflection electrodes and has input terminals connected to leads 23. Storage tube 36 also includes a gun 40 for producing a reading beam therein, and this gun is connected to any suitable energizing source (not shown). The reading beam is scanned in a line-scanning direction over the opposite surface of screen 37 by means of deflection electrodes 42. These electrodes are connected to a sweep generator 43 having input terminals connected to a frequency doubler 44 which, in turn, has input terminals connected to leads 23, and acts to produce pulses of a frequency twice the repetition frequency of pulses applied thereto. A load impedance 45 is connected between screen 37 and a point of fixed reference potential, here shown to be ground, and the common junction of the screen and load impedance is connected to a low-pass filter 46. The output terminals of filter 46 are connected to mixer amplifier 14. The storage tube 36 is also equipped with additional deflection elements 47 and 48 for deflecting the reading and writing beams respectively in a direction perpendicular to the line-scanning direction of electrodes 38 and 42. The deflection elements 47 are connected to the output terminals of a pulse generator 49, having input terminals connected to leads 23. The deflection elements 48 are connected to the output terminals of a phase inverter 50, the input terminals of which are connected to pulse generator 49.

The video-signal components, representing the shade values of an image scanned during the scanning process of picture tube 10, are obtained from the picture tube and amplified in video amplifier 11. The high frequency components of the generated video signal, for example, those above one megacycle, are selected and translated by high-pass filter 13 and supplied to delay line 12 wherein they are delayed an interval corresponding to the time of two line scanning cycles of tube 10. The delayed high-frequency video components from delay line 12 are supplied to mixer amplifier 14 wherein they are mixed with low-frequency components from filter 46, as explained hereinafter, and with horizontal and vertical synchronizing components and blanking pedestals from generator 19. The composite signal from mixer 14 is applied to direct-current reinserter 15 wherein it is properly adjusted as to background level. The signal from reinserter 15 is impressed on carrier-wave generator and modulator 16 and is modulated on a suitable carrier wave for transmission from antenna circuit 17, 18.

The generator 19 applies field-synchronizing signals to leads 22 to control the operation of field-sweep generator 20 and, thus, the field scansion of device 10. It also applies line-synchronizing signals to leads 23 to control the operation of line-sweep generator 21 and, thus, the line scansion of device 10. At the same time, field-synchronizing signals from generator 19 are impressed on frequency divider 26.

The line-and field-synchronizing pulses generated by generator 19 are shown in curve A of Figure 2 and are indicated respectively as 60 and 61. In actual practice, many line pulses 60 occur in the field-trace intervals between successive ones of the field pulses 61, but only three line pulses have been shown in order to simplify the drawing. The frequency divided pulse output of divider 26 is shown in curve B, two frequency divided pulses occurring in the illustrated interval. The pulse output of divider 26 is used to trigger multivibrator 27 which generates positive-polarity pulses such as the pulse of curve C. The output pulses of multivibrator 27 actuate key-signal generator 28 so that a burst of signal energy of sinusoidal wave form, shown in curve D, occurs in line circuit 29 in response to each positive-polarity pulse from multivibrator 27. The bursts of signal energy from generator 28 are rectified in filter and rectifier 30 to produce the rectified signal of curve E, the unit 30 being properly biased to respond to each burst only when its amplitude exceeds a preselected minimum.

The control circuit 31, which operates in a manner to be described, produces pulses of positive polarity in response to each field pulse applied to its input terminals during intervals in which the amplitude of the rectified signal of curve E is materially less than its maximum value, two such positive-polarity pulses being indicated 62 in curve F. On the other hand, this control circuit produces pulses of negative polarity in response to each field pulse applied during intervals when the signal of curve E has its maximum value, two such negative-polarity pulses being indicated 63 in curve F. The pulses from control circuit 31 are impressed on multivibrator 32 which in response thereto generates negative-polarity pulses, such as the pulse shown in curve G. Each pulse of curve G has a leading edge determined by the first negative-polarity pulse 63 from control circuit 31 succeeding a positive-polarity pulse 62 and a lagging edge determined by the first positive-polarity pulse 62 succeeding the negative-polarity pulse 63.

The pulses from the multivibrator 32 (curve G) are impressed on keying circuit 33 which generates the square wave of curve H during successive field-trace intervals. The square wave has a fundamental frequency equal to the line-scanning frequency and its amplitude excursions from minimum to maximum occur at the leading edges of the line-synchronizing pulses 60 of curve A during intervals between the pulses from multivibrator 32 (curge G). For the duration of each pulse from multivibrator 32, however, the amplitude excursion from maximum to minimum of the square wave is in time coincidence with the leading edges of the line-synchronizing pulses. That is, the square wave from keying circuit 33, as shown in curve H, may be said to undergo a phase reversal for the duration of each pulse from multivibrator 32.

In brief, it is seen that the positive pulse component of curve C is timed by field pulses of the transmitting system but after the repetition rate of those pulses has been divided. The leading and trailing edge of this pulse component turns the key-signal generator on and off and the inertia of the generator introduces the build up and decay interval following the leading and lagging edge portions of this pulse component, as will be apparent from a study of curves C and D. Since control circuit 31 requires a maximum amplitude signal from rectifier 30 as well as a field-synchronizing pulse to develop a negative-polarity pulse 63, the first one of such negative-polarity pulses is delayed one field interval relative to the turning on of generator 28. Likewise, the first positive-polarity pulse 62 from control circuit 31 is delayed one field period with respect to the turning off of generator 28. The pulses (curve G) from multivibrator 32 cause keying circuit 33 to be timed in accordance with the change in polarity of the output pulses of control circuit 31 (curve F) and, consequently, the phase reversals of the square wave of curve H occur during field-retrace intervals of the transmitter but at intervals corresponding substantially to one field period after the turning on and off of key-signal generator 28, and the corresponding initiation and termination of the key-signal burst (curve D) in line circuit 29.

The low-frequency components of the video signal generated by device 10 during a series of similar line-trace intervals are supplied to writing gun 35 of storage tube 36 through low-pass filter 34 which translates only those video components below one megacycle. These low-frequency components modulate the writing beam of tube 36 as this beam scans screen 37 under the influence of electrodes 38. These electrodes are energized at the line-scanning frequency of the transmitter by means of sweep generator 39 which develops the scanning signal of curve K, a saw-tooth wave in synchronism and phase with the line-scanning pulses applied to the picture tube 10. The writing beam is deflected perpendicularly to this line-scanning direction by means of deflection coils 47, energized by generator 49 which generates a square-wave signal of curve L having a fundamental frequency of half the line frequency. In this manner, the writing beam of tube 36 records the low-frequency video components generated by the picture tube 10 on screen electrode 37, storing this information with the same time distribution with which it was developed by tube 10, but alternating the recording between two spaced line traces on the electrode.

The reading beam of tube 36 is scanned over screen 37 in accordance with the signal of curve J applied to electrodes 42. This signal comprises a saw-tooth component which is generated by sweep generator 43 and shown in curve I having a frequency which is twice the line-scanning frequency, added to the square wave of curve H which is generated by keying circuit 33. The reading beam is deflected perpendicularly to its line scansion by means of deflection coils 48 which are energized by the signal of curve M derived from phase inverter 50 and corresponding to the deflection signal of curve L except for the phase inversion. Consequently, the writing beam inscribes the first line trace of low-frequency video information on screen 37 while the reading beam scans the second and displaced line of screen 37. The writing beam then records another line of low-frequency video information on the second line of screen 37 while the reading beam scans and reads the video information stored on the first line of the screen during the preceding line trace interval, and so on. In other words, the low-frequency video information stored in any line of screen 37 is read one line-trace interval later by the reading beam.

The successive lines of low-frequency video information derived from screen 37 by the reading beam appear across load impedance 45 and are supplied through low-pass filter 46 to mixer amplifier 14 wherein they are added to the signal from delay line 12, along with the synchronizing and blanking components from generator 19, to form the composite signal for application to units 15 and 16. Since succeeding lines of high-frequency video information are delayed by two line intervals in delay line 12, while the lines of low-frequency video information are delayed but one line interval in storage tube 36, the various lines of high-frequency video information in the radiated television signal are delayed relative to corresponding lines of low-frequency video information by an interval corresponding to one line.

The various lines of low-frequency video components supplied to mixer amplifier 14 are scrambled or coded from time to time in the following manner. Examination of curves J and K reveals that during spaced intervals the scansion of the reading beam of storage tube 36 is altered with respect to the line scan of the writing beam. In what may be considered as operating mode A, and when the square wave of curve H from keying circuit 33 has the indicated phase, the line scansion of the reading beam is transposed. That is, the latter half of each line inscribed on screen 37 of the writing beam is read first and the first half of each line is read last so that the components derived from the storage tube during this operating mode have a time distribution in each line scan interval different from the time distribution of these components as stored on screen 37 by the writing beam. This sequence of scanning of the reading beam and resulting scrambling of each line of low-frequency video components continues until there is a reversal in phase of the square-wave signal of curve H. In the latter condition the system may be considered as operating in mode B in which the scanning of the reading beam over each line of low-frequency video information inscribed on screen 37 progresses in the same sequence as the scanning of the writing beam. Therefore, the video signal from load impedance 45 during mode B has a time distribution in each line scan corresponding to the time distribution of video signal generated by tube 10 and stored in electrode 37 by the reading beam. It is to be noted that during mode A operation, the retrace of the reading beam occurs when only the latter half of each line of video information inscribed on screen 37 has been read on the beam, however, this retrace is made sufficiently rapid so that the first half of each line is not read by the beam to any appreciable extent during this return trace.

Changes from mode A to mode B occur during field-retrace intervals and with a delay of approximately one field interval relative to the start and termination, respectively, of each burst of key signal, as explained previously in the discussion of curves C, D, F, G and H. Thus, even though slight time delays of the key-signal bursts might occur in line circuit 29, compensating changes in mode at the receiver can be effected in synchronism with mode changes at the transmitter by initiating such changes at the receiver during the field-retrace intervals succeeding the initiation and termination of each key-signal burst received by the receiver, regardless of the precise times of initiation and termination of the individual bursts. The manner in which the above-described action is carried out at the receiver is to be described in detail hereinafter.

It is noted that since changes in the operation of the transmitter from mode to mode are made during field-retrace intervals, any distortion that might otherwise be introduced into the images reproduced at the subscriber receivers, should these changes in mode occur during trace intervals, is precluded. The transitions in scansion of the reading beam of storage tube 36 when the transmitter is operating in mode A tend to introduce discontinuities into the various lines of low-frequency video information. For this reason, low-pass filter 46 is provided. This filter may be constructed, for example, to translate only signal frequencies below one megacycle, and the aforementioned transitions in scansion made sufficiently rapid so that the distortion frequencies are suppressed in this filter and the low-frequency video information which extends only to one magacycle is translated thereby.

The control circuit 31 shown in detail in Figure 3, may include an electron-discharge device 70 having a cathode connected to ground through a biasing network comprising a resistor 71 and a shunt capacitor 72. The high-potential terminal of the parallel-connected elements is connected through an isolating resistor 73 to a source of unidirectional potential B+. This biasing network normally biases device 70 to cut-off. The control electrode of the device is connected to ground through series-connected resistors 74 and 75 while the anode thereof is connected to the energizing source B+ through a load resistor 76. The field-synchronizing pulses are supplied to the device by way of terminals 77, one of these terminals being connected to the junction of resistors 74 and 75 through an isolating resistor 78 and the other being grounded. Moreover, there is a direct-current connection from the first-mentioned terminal 77 to the anode of device 70 through a resistor 79 for reasons to be described. Rectified key-signal bursts from filter and rectifier 30 are impressed between the control electrode and ground by way of terminals 80. The output circuit of the device is coupled through a capacitor 81 and the way of terminals 82 to multivibrator 32.

When the signal from rectifier 30 is of minimum amplitude, device 70 is biased to cut-off and the field-synchronizing pulses applied to terminals 77 are not translated by the device. Nevertheless, these pulses are supplied to output terminals 82 through resistor 79 and coupling capacitor 81 and appear with positive polarity as indicated at 62 in curve F of Figure 2. During intervals when the signal from rectifier 30 is of maximum amplitude, this signal overcomes the bias of device 70 and renders the device conductive. When this occurs, the field-synchronizing pulses applied to terminals 77 are translated by the device and appear in its anode circuit with negative polarity. These applied pulses are also directly impressed on the output circuit through resistor 79 and appear therein with positive polarity. The amplification of device 70 is preferably of the order of two times so that the resultant pulses in the output circuit are of negative polarity as indicated at 63 is curve F and have an amplitude corresponding to that of the positive-polarity pulses 62. Since multivibrator 32 is of the single-shot type, each pulse 62 triggers it in one sense and each pulse 63 triggers it in the other sense. In this manner, the output signal of curve G is derived from the multivibrator under the control of the pulse components represented in curve F.

A detailed diagram of the keying circuit 33 is shown in Figure 4. The keying circuit includes a pair of input terminals 90 connected to synchronizing-signal generator 19 to derive line-synchronizing pulses therefrom. One of the terminals 90 is connected to ground, and the other is connected to the control electrode 91 of an electron-discharge device 92 through a capacitor 93, the control electrode 91 being connected to ground through a resistor 94. The anode 95 of device 92 is connected to control electrode 96 of a discharge device 97 through a capacitor 98, the control electrode 96 being connected to ground through series-connected resistors 99 and 100.

Cathode 101 of device 92 is directly connected to cathode 102 of device 97, and these cathodes are connected to the junction of resistors 99 and 100. The anode 103 of device 97 is connected to the positive terminal of a source of unidirectional potential through a resistor 104, and anode 95 of device 92 is connected to this positive terminal through a load resistor 105. The devices 92 and 97 are connected to form a well-known multivibrator circuit. Positive pulses applied across terminals 90 trigger the circuit from a first operating condition to a second operating condition. The parameters of the multivibrator circuit are so chosen that the multivibrator remains in its second condition for an interval equal to one half a line-trace interval and then returns to its first condition. The multivibrator then remains in its first condition until the next succeeding positive pulse initiates another sequence of operations.

The keying circuit 33 also includes a second pair of input terminals 106 connected to multivibrator 32 of Figure 1 to derive positive pulses therefrom. One of the terminals 106 is grounded and the other is connected to the junction of series-connected resistors 107 and 108 coupling the control electrode 116 of an electron-discharge device 117 to ground. The ungrounded terminal 90 is coupled to control electrode 116 of device 117 through a capacitor 118. The anode 119 of device 117 is directly connected to the anode 120 of another discharge device 121, and these anodes are connected to the positive terminal B+ through a common load resistor 122. The cathode 123 of device 117 is directly connected to the cathode 124 of device 121, these cathodes being connected to ground through a common resistor 125 and to the positive terminal B+ through a biasing resistor 126.

The anode 95 of device 92 is coupled to the control electrode 127 of device 121 through a coupling capacitor 128, this control electrode being connected to ground through a resistor 129 and to the positive terminal B+ through a biasing resistor 130. The devices 117 and 121 form a switching circuit which acts in a manner to be described to translate line pulses from the terminals 90 to its output circuit during one operating condition, and to translate pulses derived from multivibrator 92, 97 to its output circuit during a second operating condition, these latter pulses being differentiated by the network 128, 129.

The anodes 119 and 120 of devices 117 and 121 are coupled to the control electrode 131 of a discharge device 132 through a coupling capacitor 133, this control electrode being connected to ground through a resistor 134. The cathode 135 of device 132 is connected to ground and the anode 136 of this device is connected to the positive terminal B+ through a load resistor 137. The device 132 is a limiter and phase inverter for the pulses derived from switching circuit 117, 120.

The anode 136 is coupled to the control electrode 138 of a discharge device 139 through a coupling capacitor 140, this control electrode being connected to ground through a resistor 141. The cathode of device 139 is directly coupled to the cathode of a discharge device 142, and these cathodes are connected to the junction of series-connected resistors 143 and 144 connecting the control electrode 145 of device 142 to ground. The anode of device 139 is connected to the positive terminal B+ through a resistor 146 and to control electrode 145 of device 142 through a capacitor 147. The anode of device 142 is connected to the positive terminal B+ through a load resistor 148 and to one of the output terminals 149 of the keying circuit, the other output terminal being grounded. The devices 139 and 142 form a multivibrator circuit similar in construction to the multivibrator circuit of devices 92 and 97 and having the same circuit parameters.

The operation of the keying circuit of Figure 4 may best be understood by reference to the curves of Figure 4A. Curve N represents line-synchronizing pulses supplied to input terminals 90 to trigger the multivibrator circuit of devices 92 and 97. The output signal of the multivibrator, as shown in curve O, has an essentially square wave form and a fundamental frequency equal to the repetition frequency of the line-synchronizing pulses. This signal appears across load resistor 105 and is impressed on control electrode 127 of device 121 of the switching circuit through the differentiating circuit 128, 129. The differentiated signal applied to the control electrode is shown in curve P. The line-synchronizing pulses of curve N are impressed on control electrode 116 of device 117 through capacitor 118, and the positive-polarity pulses from the multivibrator 32 of Figure 1 (a portion of one of such pulses being shown in wave form Q) are also supplied to this control electrode through resistor 107.

During each positive-polarity pulse from multivibrator 32 the transmitter is assumed to be operating in mode A, as previously pointed out. In this mode, device 117 is rendered conductive since the positive-polarity pulse applied to its control electrode overcomes the bias established in its cathode due to the potentiometer arrangement of resistors 125 and 126. The resulting space current flow in device 117 causes a potential drop across cathode resistor 125 of sufficient amplitude to bias device 121 to cut-off. Therefore, during mode A, device 117 translates the line-synchronizing pulses applied to its control electrode 116 but device 121 does not translate the differentiated multivibrator output signal applied to its control electrode 127. Thus, during this mode of operation the switching circuit translates only the line-synchronizing pulses which appear with a phase reversal at its output circuit as shown by the pulses $r_1$ and $r_2$ of curve R.

During the intervals between the positive pulses from multivibrator 32, the system is assumed to be operating in mode B as previously pointed out. In this latter mode device 117 is rendered non-conductive due to the biasing action of potentiometer 125, 126. However, this bias is insufficient to overcome the biasing action of potentiometer 129, 130 on control electrode 127 of device 121 and this latter device is conductive. Therefore, during mode B operation, device 121 translates the differentiated multivibrator output signal which appears with a phase reversal in its output circuit as shown by the pulses $r_3$ to $r_7$ of curve R.

The pulses of curve R are supplied to discharge device 132 wherein they are phase inverted and limited, appearing as shown in curve S across load resistor 137. Each pulse of curve S is utilized to trigger multivibrator 139, 142 from a first operating condition to a second. The multivibrator remains in its second operating condition for an interval equal to one-half the line-trace interval and then returns to its first operating condition wherein it remains until the next succeeding pulse of curve S initiates another sequence of operations. Therefore, an output signal of square wave form, such as shown in curve T, is produced across output terminals 149. The output signal has a preselected phase during mode A operation and an inverted phase during mode B operation, as shown, and as previously described is supplied to storage tube 36 in series with the sweep signal from generator 43 to scramble the low-frequency video components translated by the storage tube.

The receiver illustrated in Figure 5 includes a radio-frequency amplifier 150 of one or more stages, a first detector 151, an intermediate-frequency amplifier 152 of any desired number of stages and a second detector 153, these units being of any well-known construction and cascade-connected in well-known fashion. The input terminals of radio-frequency amplifier 150 may be connected to a suitable antenna circuit 154, 155. The output terminals of second detector 153 are connected to a high-pass filter 13 adapted to translate the high-frequency video components of a received television signal. The high-pass filter 13 is connected to a video amplifier 156 which, in turn, is connected to the control electrode and cathode of a cathode-ray image-reproducing tube 157. The second detector 153 is connected to a synchronizing-signal separator 158 which, in turn, is connected to a field-sweep generator 159 and to a line-sweep generator 160. The generators 159 and 160 are connected respectively to the field-deflection elements 161 and line-deflection elements 162 of reproducing device 157. The second detector 153 is further connected through a low-pass filter 34, to the writing gun 35 of a storage tube 36. The storage tube 36 may be of the same construction as the storage tube at the transmitter. In general, the components of the receiver identified by reference characters applied to components of the transmitter have the same construction and mode of operation as such similarly identified portions of the transmitter.

When the receiver is tuned to utilize the subscription television signal, transmitted by the transmitter of Figure 1, this signal is intercepted by antenna circuit 154, 155, amplified in radio-frequency amplifier 150 and heterodyned to the selected intermediate frequency of the receiver in first detector 151. The resulting intermediate-frequency signal is amplified in intermediate-frequency amplifier 152 and detected in second detector 153. The high-frequency components of the composite video portion of the received television signal are selected and translated by high-pass filter 13, amplified in video amplifier 156, which may include a suitable direct-current restoration circuit, and supplied to reproducing device 157 to control the intensity of the cathode ray therein.

The synchronizing components of the received television signal are separated from the composite video portion in synchronizing-signal separator 158. The resulting field- and line-synchronizing pulses are utilized to control the operation of field-sweep generator 159 and line-sweep generator 160. In this manner, the field- and line-scansions of reproducing device 157 are synchronized with the incoming television signal.

The low-frequency video components of the received television signal are translated by low-pass filter 34 and applied to writing gun 35 of storage tube 36 to modulate the writing beam therein. The writing beam in storage tube 36 is scanned and deflectd by means of electrodes 38 and coils 47 in the same manner as the writing beam in storage tube 36 at the transmitter. The electrodes 38 and coils 47 are connected, respectively, to sweep generator 39 and to pulse generator 49, these generators being synchronized at the line frequency by means of line-synchronizing pulses derived from line-sweep generator 160. The reading beam in storage tube 36 is scanned and deflected by means of electrodes 42 and coils 48 in the same manner as the reading beam in storage tube 36 at the transmitter. The electrodes 42 are connected to the keying circuit 33 and sweep generator 43, the sweep generator 43 being synchronized at twice the line-scan frequency by means of pulses derived from the frequency doubler 44 which, in turn, is energized by line-synchronizing pulses derived from line-sweep generator 160. The coils 48 are connected to the phase inverter 50 so that the reading beam may be deflected to read each line of video information inscribed on the screen 37 by the writing beam one line interval after each inscription by the writing beam.

The lines of low-frequency video information derived from screen 37 by the reading beam appear across the load impedance 45 and are supplied to video amplifier 156 through the low-pass filter 46. As previously explained the lines of high-frequency video information are delayed in delay line 12 at the transmitter an amount corresponding to two line intervals, whereas the low-frequency video information is delayed an amount corresponding to one line-trace interval by the transmitter storage tube 36. The low-frequency components are delayed another line-trace interval by the receiver storage tube 36. Therefore, the lines of low-frequency video information applied to video amplifier 156 by filter 46 arrive in time coincidence with the correctly associated lines of high-frequency video information delivered to this amplifier by high-pass filter 13. Accordingly, the low and high video components applied to image-reproducing device 157 are properly correlated for accurate reproduction of the image intelligence by this device.

Any change in the operation at the transmitter from mode A to mode B is preceded by an initiation of a key-signal burst on line circuit 29, and any change from mode B to mode A follows the termination of the burst of key-signal energy. These key-signal bursts are supplied to key-signal filter and rectifier 30 and condition the control circuit 31 so that the field pulses succeeding the initiation and termination of such key-signal bursts cause a phase reversal in the output pulses of the control circuit. These pulses actuate the multivibrator 32 during the field-retrace intervals following each initiation and termination of the key-signal bursts to give rise to a phase reversal in the square-wave signal generated by the keying circuit 33. Such phase reversals in the square wave occur in time coincidence with similar phase reversals at the transmitter. Therefore, the receiver portion undergoes compensating changes in mode during times indicated by the key-signal bursts on line circuit 29, and this enables reproducing device 157 to reproduce the intelligence represented by the high- and low-frequency components of the video portion of the received television signal.

This invention provides a subscription type of television system in which the video portion of a radiated television signal may contain high-frequency components delayed with respect to the low-frequency components thereof. This invention further provides a subscription television system in which succeeding lines of video information are transmitted with inverted or scrambled characteristics during spaced intervals to provide additional coding of the radiated television signal, the times of occurrence of these intervals being indicated to subscriber receivers by a wire-conducted key signal so that the receiver operation may be controlled to compensate for the scrambled video information.

In the illustrated embodiment of the invention, the lines of video information are split in half, and in one mode of operation the halves of each line are transmitted in an inverted sequence. It is within the intended scope of the invention that such lines be divided in thirds or any other fraction and transmitted with a preselected inverted sequence of the various fractions from time to time. Moreover, the coding of the video information may be effected by merely reversing the scan of the reading beam during spaced intervals so that the video information appears in an inverted sense in the radiated television signal.

It is noted that in the described embodiment only the low-frequency components of the video signal are transmitted in scrambled form. This is merely a matter of expediency and it is within the bounds of the invention that the entire video signal be scrambled in like manner, if so desired.

It is also within the concept of the present invention that the storage tubes at the transmitter and receiver be replaced by any suitable type of delay line. The delay line may be equipped with a plurality of take off points along its length and the video information derived from the delay line in scrambled form by switching the take off points into the receiver circuit in any desired sequence.

While a particular embodiment of the invention has been shown and described, modifications may be made and it is intended in the appended claims to cover all such modifications as fall within the true spirit and scope of the invention.

I claim:

1. A method of subscription type broadcasting comprising: producing during each of a series of similar trace intervals a video signal having components, representing information to be broadcast, extending through a specified frequency range and occurring in each of said trace intervals with a time distribution determined by said information; separating those of said components included in a portion of said frequency range from those of said components in the remainder of said frequency range; storing said components included in said portion of said frequency range for a preselected interval; deriving from said stored components during another series of similar trace intervals coded components occurring in each of said trace intervals with a time distribution different from said first-mentioned time distribution; combining said coded components with said components in the remainder of said frequency range; and transmitting said combined components over a signal channel.

2. A method of subscription type broadcasting comprising: producing during each of a series of similar trace intervals a video signal having components, representing information to be broadcast, extending through a specified frequency range and occurring in each of said trace intervals with a time distribution determined by said information; separating those of said components included in a low-frequency portion of said frequency range from those of said components in the remainder of said frequency range; storing said low-frequency components for a preselected interval; deriving from said stored components during another series of similar trace intervals coded components occurring in each of said trace intervals with a time distribution different from said first-mentioned time distribution; combining said coded components with said components in the remainder of said frequency range; and transmitting said combined components over a signal channel.

3. A method of subscription type broadcasting comprising: producing during each of a series of similar trace intervals a video signal having components, representing information to be broadcast, extending through a specified frequency range and occurring in each of said trace intervals with a time distribution determined by said information; separating those of said components included in a low-frequency portion of said frequency range from those of said components in the remainder of said frequency range; storing said low-frequency components for a preselected interval; deriving in a first operating mode from said stored components during another series of similar trace intervals uncoded components occurring in each of said trace intervals with a time distribution corresponding to said first-mentioned time distribution; deriving in a second operating mode from said stored components during another series of similar trace intervals coded components occurring in each of said trace intervals with a time distribution different from said first mentioned time distribution; combining said derived components with said components in the remainder of said frequency range; and transmitting said combined components over a signal channel.

4. A method of subscription type broadcasting comprising: producing during each of a series of similar trace intervals a video signal having components, representing information to be broadcast, extending through a specified frequency range and occurring in each of said trace intervals with a time distribution determined by said information; separating those of said components included in a low-frequency portion of said frequency range from those of said components in the remainder of said frequency range; storing said low-frequency components for a preselected interval; deriving during spaced operating periods from said stored components during another series of similar trace intervals coded components occurring in each of said trace intervals with a time distribution different from said first-mentioned time distribution; deriving during operating periods other than said spaced periods from said stored components during another series of similar trace intervals uncoded components occurring in each of said trace intervals with a time distribution corresponding to said first-mentioned time distribution; combining said derived components with said components in the remainder of said frequency range; transmitting said combined components over a first signal channel; and generating a key signal indicating said spaced operating periods for transmission over a second signal channel.

5. A subscription type of television transmitter comprising: a video-signal source for producing during each of a series of similar trace intervals a video signal having components, representing information to be broadcast, extending through a specified frequency range and occurring in each of said trace intervals with a time distribution determined by said information; a filter network coupled to said source for separating those of said components included in a portion of said frequency range from those of said components included in the remainder of said frequency range; a storage device coupled to said filter network for storing said components included in said portion of said frequency range for a preselected interval in a certain space-time relation; means including apparatus coupled to said storage device for effecting scansion of said stored components during another series of similar trace intervals and in accordance with a different space-time relation, to develop coded components occurring in each of said trace intervals with a time distribution different from said first-mentioned time distribution; a mixer amplifier coupled to said filter network and to said means for combining said coded components with said components in the remainder of said frequency range; and means for transmitting said combined components to a point remote from said transmitter over a signal channel.

6. A subscription type of television transmitter comprising: a video-signal source for producing during each of a series of similar trace intervals a video signal having components, representing information to be broadcast, extending through a specified frequency range and occurring in each of said trace intervals with a time distribution determined by said information; a filter network coupled to said source for separating those of said components included in a low-frequency portion of said frequency range from those of said components in the remainder of said frequency range; a storage device coupled to said filter network for storing said low-frequency components for a preselected interval in a certain space-time relation; means, including apparatus coupled to said storage device for effecting scansion of said stored components during another series of similar trace intervals and in accordance with a different space-time relation, to develop coded components occurring in each of said trace intervals with a time distribution different from said first-mentioned time distribution; a mixer amplifier coupled to said filter network and to said means for combining said coded components with said components in the remainder of said frequency range; and means for transmitting said combined components to a point remote from said transmitter over a signal channel.

7. A subscription type of television transmitter comprising: a video-signal source for producing during each of a series of similar trace intervals a video signal having components, representing information to be broadcast, extending through a specified frequency range and occurring in each of said trace intervals with a time distribution determined by said information; a filter network coupled to said source for separating those of said components included in a low-frequency portion of said frequency range from those of said components included in the remainder of said frequency range; a storage device coupled to said filter network for storing said low-frequency components for a preselected interval in a certain space-time relation; means, including apparatus coupled to said storage device for effecting scansion of said stored components during another series of similar trace intervals and in accordance with a different space-time relation, to develop coded components occurring in each of said trace intervals with a time distribution different from said first-mentioned time distribution; a circuit for applying an actuating signal to said apparatus to actuate said apparatus during spaced operating intervals in accordance with a coding schedule; a mixer amplifier coupled to said filter network and to said storage device for combining said coded components with the components in the remainder of said frequency range; and means for transmitting said combined components to a point remote from said transmitter over a signal channel.

8. A subscription type of television transmitter comprising: a video-signal source for producing during each of a series of similar trace intervals a video signal having components, representing information to be broadcast, extending through a specified frequency range and occurring in each of said trace intervals with a time distribution determined by said information; a filter network coupled to said video source for separating those of said components included in a low-frequency portion of said frequency range from those of said components included in the remainder of said frequency range; a storage device coupled to said filter network for storing said separated components for a preselected interval in a certain space-time relation; means including apparatus coupled to said storage device for effecting scansion in a first operating mode of said stored components during another series of similar trace intervals and in accordance with a certain space-time relation, and for effecting scansion thereof in a second operating mode in accordance with a different space-time relation, to cause said storage device to develop coded components occurring in each of said trace intervals with a time distribution corresponding to said first-mentioned time distribution in said first operating mode, and with a time distribution different from said first-mentioned time distribution in said second operating mode; a circuit for applying an actuating signal to said apparatus to alter said operating modes during spaced intervals in accordance with a coding schedule; a key-signal generator for generating a key-signal indicating said coding schedule for transmission to a point remote from said transmitter over a first signal channel; a mixer amplifier coupled to said filter network and to said storage device for combining said coded components with the components in the remainder of said frequency range; and means for transmitting said combined components to said remote point over a second signal channel.

9. A subscription television receiver for utilizing a video signal including during each of a series of similar trace intervals components extending through one portion of the frequency spectrum and occurring with a time distribution determined by the scanning of an image being broadcast and further including coded components extending through a different portion of the frequency spectrum and occurring with a time distribution different from that determined by the scanning of said broadcast image, said receiver comprising: a filter network for separating said coded components from said first-mentioned components of said video signal; a storage device coupled to said filter network for storing said coded components for a preselected interval in a certain space-time relation; means, including apparatus coupled to said storage device for effecting scansion of said stored components during a corresponding series of trace intervals and in accordance with a different space-time relation, to develop compensated components occurring in each of said trace intervals with a time distribution corresponding to that determined by the scanning of said broadcast image; a circuit coupled to said filter network and to said means for combining said compensated components and said first-mentioned components; and an image reproducing device coupled to said last mentioned circuit for utilizing said combined components to reproduce said broadcast image.

10. A subscription television receiver for utilizing a video signal including during each of a series of similar trace intervals components extending through one portion of the frequency spectrum and occurring with a time distribution determined by the scanning of an image being broadcast and further including coded components extending through a different lower-frequency portion of the frequency spectrum and occurring with a time distribution different from that determined by the scanning of said broadcast image, said receiver comprising: a low-pass filter network for separating said coded components from said video signal; a high-pass filter for separating said first-mentioned components from said video signal; a storage device coupled to said low-pass filter network for storing said coded components for a preselected interval in a certain space-time relation; means, including apparatus coupled to said storage device for effecting scansion of said stored components during a corresponding series of trace intervals and in accordance with a different space-time relation, to develop compensated components occurring in each of said trace intervals with a time distribution corresponding to that determined by the scanning of said broadcast image; a circuit coupled to said high-pass filter network and to said means for combining said compensated components and said first-mentioned components; and an image-reproducing device coupled to said last mentioned circuit for utilizing said combined components to reproduce said broadcast image.

11. A subscription television receiver for utilizing a video signal including during each of a series of similar trace intervals components extending through one portion of the frequency spectrum and occurring with a time distribution determined by the scanning of an image being broadcast and further including coded components extending through a different lower-frequency portion of the frequency spectrum and occurring with a time distribution that during spaced intervals is different from that determined by the scanning of said broadcast image, said receiver comprising: a low-pass filter network for separating said coded components from said video signal; a high-pass filter network for separating said first-mentioned components from said video signal; a storage device coupled to said low-pass filter network for storing said coded components for a preselected interval in a certain space time relation; means, including apparatus coupled to said storage device for effecting scansion of said stored components and in accordance with the same space-time relation to develop in one operating mode and during a corresponding series of trace intervals uncompensated components occurring in each of said trace intervals with a time distribution corresponding to that of said stored components and for effecting scansion in a second operating mode of said stored components and during a corresponding series of trace intervals and in accordance with a different space-time relation, to develop compensated components occurring in each of said trace intervals with a time distribution different from that of said stored components but corresponding to that of the scanning of said broadcast image; means for applying a signal to said apparatus for actuating said apparatus from said first to said second operating mode during said spaced intervals; a circuit coupled to said high-pass filter network and to said storage device for combining said developed components and said first-mentioned components; and an image reproducing device coupled to said last-mentioned circuit for utilizing said combined components to reproduce said broadcast image.

12. A subscription television receiver for utilizing a video signal received over a first signal channel and including during each of a series of similar trace intervals components extending through one portion of the frequency spectrum and occurring with a time distribution determined by the scanning of an image being broadcast and further including coded components extending through a different lower-frequency portion of the frequency spectrum and occurring with a time distribution that during spaced intervals is different from that determined by the scanning of said broadcast image, and for concurrently utilizing a key signal indicating said spaced intervals and received over a line circuit, said receiver comprising: a low-pass filter network for separating said coded components from said video signal; a high-pass filter network for separating said first-mentioned components from said video signal; a storage device coupled to said low-pass filter network for storing said coded components for a preselected interval in a certain space-time relation; means, including apparatus coupled to said storage device for effecting scansion of said stored components and in accordance with the same space-time relation, to develop in one operating mode and during a corresponding series of trace intervals uncompensated components occurring in each of said trace intervals with a time distribution corresponding to that of said stored components and for deriving in a second operating mode of said stored components and during a corresponding series of trace intervals and in accordance with a different space-time relation, to develop compensated components occurring in each of said trace intervals with a time distribution different from that of said stored components but corresponding to that of the scanning of said broadcast image; means coupled to said line circuit and responsive to said key signal for applying a signal to said apparatus for actuating said apparatus from said first to said second operating mode during said spaced intervals; a circuit coupled to said high-pass filter network and to said apparatus for combining said developed components and said first-mentioned components; and an image reproducing device coupled to said last-mentioned circuit for utilizing said combined components to reproduce said broadcast image.

13. In a subscription type of television system, a transmitter comprising: a video-signal source for producing during each of a series of similar trace intervals a video signal having components, representing the scanning of an image to be broadcast, extending through a specified frequency range and occurring in each of said trace intervals with a time distribution determined by the scanning of said image; a filter network coupled to said source for separating those of said components included in a portion of said frequency range from those of said components included in the remainer of said frequency range; a storage device coupled to said filter network for storing said components included in said portion of said frequency range for a preselected interval in a certain space-time relation; means, including apparatus coupled to said storage device for effecting scansion of said stored components during another series of similar trace intervals and in accordance with a different space-time relation, to develop coded components occurring in each of said trace intervals with a time distribution different from that determined by the scanning of the broadcast image; a mixer amplifier coupled to said filter network and to said means for combining said coded components with said components in the remainder of said frequency range; means for transmitting said combined components to a subscriber receiver over a signal channel; said receiver comprising: a filter network for separating said coded components from said video signal; a storage device coupled to said filter network for storing said coded components for a preselected interval in a certain space-time relation; means, including apparatus coupled to said last-mentioned storage device for effecting scansion of said stored components during a corresponding series of trace intervals and in accordance with a different space-time relation, to develop compensated components occurring in each of said trace intervals with a time distribution corresponding to that determined by the scanning of said broadcast image; a circuit coupled to said filter network and to said apparatus for combining said compensated components with said components in the remainder of said frequency range; and an image reproducing device coupled to said last-mentioned circuit for utilizing said combined components to reproduce said broadcast image.

14. Subscription type television apparatus comprising: a video-signal source for producing during each of a series of similar trace intervals a video signal representing the scanning of a televised image and having components extending through a specified frequency range; a filter network coupled to said source for separating those of said components included in a portion of said frequency range from those of said components included in the remainder of said frequency range; a storage device coupled to said filter network for storing said components included in said portion of said frequency range in another series of similar trace intervals in a certain space time relation; means, including apparatus coupled to said storage device for effecting scansion of said stored components during another series of similar trace intervals and in accordance with a different space-time relation to develop coded components occurring in each of said trace intervals with a time distribution different from that of said stored components; a mixer amplifier coupled to said filter network and to said means for combining said coded components with said components in the remainder of said frequency range; and means for utilizing said combined components.

15. Subscription type television apparatus comprising: a video-signal source for producing during each of a series of similar trace intervals a video signal representing the scanning of a televised image and extending through a specified frequency range; a low-pass filter coupled to said source for separating those components of said video signal included in a low-frequency portion of said frequency range from the other components of said video signal; a high-pass filter for separating those components of said video signal included in the remainder of said frequency range from said low-frequency components thereof; a storage device coupled to said low-pass filter for storing said low-frequency components in another series of similar trace intervals in a certain space time relation; means, including apparatus coupled to said storage device for effecting scansion in one operating mode of said stored components and in accordance with the same space-time relation, to develop during another series of similar trace intervals components occurring in each of said trace intervals with a time distribution corresponding to that of said stored components, and for effecting scansion of said coded components in accordance with a different space-time relation in a second operating mode to develop components occurring in each of said trace intervals with a time distribution different from that of said stored components; a control circuit for actuating said last-named apparatus from said first to said second operating mode during spaced intervals; a mixer coupled to said high-pass filter and to said means for combining said derived components and said high-frequency components; and means for utilizing said combined components.

16. A method of subscription broadcasting comprising: producing during each of a series of similar trace intervals a video signal having components, representing information to be broadcast, extending through a specified frequency range and occurring in each of said trace intervals with a time distribution determined by said information; storing at least those of said components which fall within a selected portion of said range; deriving from said stored components during another series of similar trace intervals coded components occurring in each of said trace intervals with a time distribution different from said first-mentioned time distribution; and transmitting said coded components over a signal channel.

17. A subscription television system comprising: a video-signal source for producing during a series of similar trace intervals a video signal having components included within a given band of frequencies; signal-storage means coupled to said source for storing at least those of said components which fall within a selected portion of said band; sensing means, including apparatus coupled to said storage means for effecting scansion of the signal components stored thereby in any selected one of a plurality of different operating modes, to develop coded signal components; a coding device coupled to and controlling said sensing means to effect operation thereof in each of said modes at spaced operating intervals and in accordance with a coding schedule; and a utilizing device coupled to said sensing means for utilizing the signal components developed thereby.

18. A subscription television transmitter comprising: a video-signal source for producing during a series of similar trace intervals a video signal having components including within a given band of frequencies; signal-storage means coupled to said source for storing at least those of said components which fall within a selected portion of said band; sensing means, including apparatus coupled to said storage means for effecting scansion of the signal components stored thereby in any selected one of a plurality of different operating modes, to develop coded signal components; a coding device coupled to and controlling said sensing means to effect operation thereof in each of said modes at spaced operating intervals and in accordance with a coding schedule; and means coupled to said sensing means for transmitting said developed signal components over a signal channel.

19. A subscription television receiver for utilizing a coded video signal having components included within a given band of frequencies and occurring at spaced intervals in different ones of a plurality of modes in accordance with a coding schedule, said receiver comprising: an input circuit for receiving said video signal; signal-storage means coupled to said input circuit for storing said components; sensing means, including apparatus coupled to said storage means for effecting scansion of the signal components stored thereby in any selected one of a plurality of operating modes, to develop compensated signal components occurring in modes corresponding to the modes of the received signal; a decoding device coupled to and controlling said sensing means to effect operation thereof in each of said modes at said spaced intervals and in accordance with said coding schedule but in a complementary sense to the changes in mode of the received signal; and an image-reproducing device coupled to said sensing means for utilizing said developed signal components.

20. A subscription television system comprising: a video signal source for producing during a series of similar trace intervals a video signal having components included within a given band of frequencies; signal-storage means coupled to said source for storing at least those of said components which fall within a selected portion of said band; apparatus coupled to said storage means for causing said storage means to develop signal components stored thereby in any selected one of a plurality of different operating modes; a control device coupled to said apparatus to effect operation thereof in each of said modes at spaced operating intervals and in accordance with a coding schedule; and a utilizing device coupled to said storage means for utilizing the signal components developed thereby.

ERWIN M. ROSCHKE.

References Cited in the file of this patent

UNITED STATES PATENTS

| Number | Name | Date |
|---|---|---|
| 2,203,758 | Walker | June 11, 1940 |
| 2,516,587 | Peterson | July 25, 1950 |
| 2,517,265 | Wald | Aug. 1, 1950 |